(12) United States Patent
Hu et al.

(10) Patent No.: US 11,275,507 B2
(45) Date of Patent: Mar. 15, 2022

(54) METHOD, ELECTRONIC DEVICE, AND COMPUTER STORAGE MEDIUM FOR INFORMATION PROCESSING

(71) Applicant: EMC IP Holding Company LLC, Hopkinton, MA (US)

(72) Inventors: Chenxi Hu, Beijing (CN); Shixu Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/875,506

(22) Filed: May 15, 2020

(65) Prior Publication Data
US 2021/0342070 A1     Nov. 4, 2021

(30) Foreign Application Priority Data
Apr. 29, 2020   (CN) .......................... 202010358946.0

(51) Int. Cl.
*G06F 3/06*     (2006.01)
*G06F 21/60*    (2013.01)

(52) U.S. Cl.
CPC .......... *G06F 3/0608* (2013.01); *G06F 3/0652* (2013.01); *G06F 3/0673* (2013.01); *G06F 21/60* (2013.01)

(58) Field of Classification Search
CPC .... G06F 3/0608; G06F 3/0673; G06F 3/0652; G06F 2212/6024; G06F 21/64; G06F 21/60
USPC ................................................. 711/103, 154
See application file for complete search history.

(56) References Cited

U.S. PATENT DOCUMENTS

| | | | | |
|---|---|---|---|---|
| 9,804,966 B1* | 10/2017 | Sadanandan | ........ | G06F 12/0862 |
| 9,977,746 B2* | 5/2018 | Muppalaneni | ...... | G06F 12/1009 |
| 2012/0260021 A1* | 10/2012 | Rudelic | ................ | G06F 12/023 |
| | | | | 711/103 |
| 2014/0082651 A1* | 3/2014 | Sharifi | ............... | H04N 21/4668 |
| | | | | 725/20 |

(Continued)

OTHER PUBLICATIONS

Wikipedia, "SHA-2." https://en.wikipedia.org/wiki/SHA-2, Jan. 8, 2020, 9 pages.

*Primary Examiner* — Hashem Farrokh
(74) *Attorney, Agent, or Firm* — Ryan, Mason & Lewis, LLP

(57) ABSTRACT

A method, an electronic device, and a computer-readable storage medium for information processing are provided according to example embodiments of the present disclosure. The method comprises receiving, at a storage device, a data block and fingerprint information correlated with the data block, the fingerprint information being configured to identify the data block; and determining a storage position of the received data block based on predetermined correlations between fingerprint information and storage positions and the received fingerprint information, the predetermined correlations comprising at least correlations between historical fingerprint information correlated with stored data blocks and historical storage positions. Thus, a storage position of a data block can be determined based on received fingerprint information and predetermined correlations between fingerprint information and storage positions, thereby improving efficiency of redundant data deletion.

20 Claims, 5 Drawing Sheets

(56) References Cited

U.S. PATENT DOCUMENTS

2014/0188893 A1* 7/2014 Kobayashi .......... G06F 16/9014
707/747
2019/0109822 A1* 4/2019 Clark .................. H04L 63/0428
2021/0194829 A1* 6/2021 Sun ......................... H04L 49/60

* cited by examiner

METHOD, ELECTRONIC DEVICE, AND COMPUTER STORAGE MEDIUM FOR INFORMATION PROCESSING

RELATED APPLICATION(S)

The present application claims priority to Chinese Patent Application No. 202010358946.0, filed Apr. 29, 2020, and entitled "Method, Electronic Device, and Computer Storage Medium for Information Processing," which is incorporated by reference herein in its entirety.

FIELD

Embodiments of the present disclosure generally relate to the field of information processing, and in particular, to a method, an electronic device, and a computer storage medium for information processing.

BACKGROUND

With the ongoing development of information technology, data volume is continually increasing. During data storage, redundant data deletion needs to be performed to improve storage efficiency. At present, there are two methods for deleting redundant data. One is referred to as a post-process method in which data is stored before redundant data is deleted. The other one is referred to as an inline method in which redundant data is deleted before storage is performed. For the post-process method, since more write and delete operations are required, more storage spaces are required and the I/O load is increased. For the inline method, no extra storage space is wasted and fewer I/O operations are required.

Since a redundant data deletion operation requires calculating hashes and/or checksums as fingerprints to identify whether data is redundant, a large quantity of computational and storage resources, for example, those of a CPU and a memory, need to be consumed, and an increased latency in an incoming redundant data deletion operation is caused. A current method for accelerating a redundant data deletion operation is to add a dedicated hardware accelerator to help a processor, for example, a CPU to process all data blocks, but the performance of the processor or the dedicated hardware accelerator limits throughput of redundant data deletion in a storage system.

SUMMARY

A method, an electronic device, and a computer storage medium for information processing are provided in the embodiments of the present disclosure, which can determine a storage position of a data block based on received fingerprint information and predetermined correlations between fingerprint information and storage positions, thereby improving the efficiency of redundant data deletion.

In a first aspect of the present disclosure, a method for information processing is provided. The method comprises: receiving, at a storage device, a data block and fingerprint information correlated with the data block, the fingerprint information being configured to identify the data block; and determining a storage position of the received data block based on predetermined correlations between fingerprint information and storage positions as well as the received fingerprint information, the predetermined correlations comprising at least correlations between historical fingerprint information correlated with stored data blocks and historical storage positions.

In a second aspect of the present disclosure, an electronic device is provided. The electronic device comprises at least one processing unit and at least one memory. The at least one memory is coupled to the at least one processing unit and stores instructions for execution by the at least one processing unit. When executed by the at least one processing unit, the instructions cause the electronic device to perform any step of the method described according to the first aspect of the present disclosure.

In a third aspect of the present disclosure, a computer-readable storage medium is provided. The computer-readable storage medium stores computer programs. When executed by a machine, the computer programs cause the machine to implement any step of the method described according to the first aspect of the present disclosure.

This Summary is provided to introduce the choice of concepts in a simplified form, which will be further described in the following Detailed Description. The Summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure, provided with reference to the accompanying drawings. In the example embodiments of the present disclosure, identical reference numerals generally represent identical members.

In the accompanying drawings, identical or corresponding reference numerals represent identical or corresponding parts.

DETAILED DESCRIPTION

Illustrative embodiments of the present disclosure are shown in the accompanying drawings, and will be described in more detail below with reference to the accompanying drawings. However, it should be understood that the present disclosure may be implemented in various forms and should not be limited by the embodiments described here. Instead, the embodiments are provided to make the present disclosure more thorough and complete and to fully convey the scope of the present disclosure to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, a current method for accelerating a redundant data deletion operation is to add a dedicated hardware accelerator to help a processor, such as a CPU, to process all data blocks, but the performance of the processor or the dedicated hardware accelerator limits throughput of redundant data deletion in a storage system.

In order to at least partially solve the above problems and one or more of other potential problems, a solution for information processing is provided in example embodiments of the present disclosure. In the solution, a data block and fingerprint information correlated with the data block are received at a storage device, the fingerprint information being configured to identify the data block; and a storage position of the received data block is determined based on predetermined correlations between fingerprint information and storage positions as well as the received fingerprint information, the predetermined correlations including at least correlations between historical fingerprint information correlated with stored data blocks and historical storage positions.

In the above solution, a storage position of a data block is determined based on received fingerprint information correlated with the data block and predetermined correlations between fingerprint information and storage positions, which avoids consuming local resources of a storage device to calculate the fingerprint information, thereby improving the efficiency of redundant data deletion.

In the following, specific examples of the solution are described in more detail with reference to the accompanying drawings.

Figure 1:
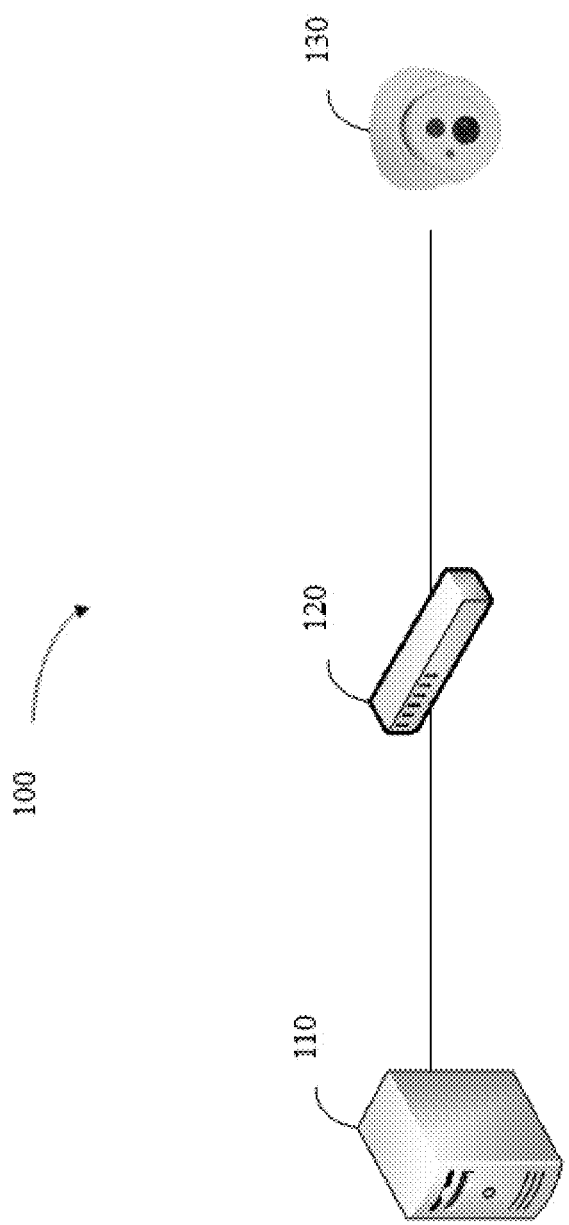
FIG. 1 is a schematic diagram of an example of information processing environment 100 according to an embodiment of the present disclosure.

FIG. 1 is a schematic diagram of an example of information processing environment 100 according to an embodiment of the present disclosure. Information processing environment 100 includes storage device 110, switching device 120, and terminal device 130.

Storage device 110 includes, but is not limited to, a personal computer, a server computer, a multiprocessor system, a mainframe computer, a distributed computing environment including any one of the above-mentioned systems or devices, etc. In some embodiments, storage device 110 may have one or more processing units, including a special-purpose processing unit such as a graphics processing unit (GPU), a field programmable gate array (FPGA), and an application-specific integrated circuit (ASIC) and a general-purpose processing unit such as a central processing unit (CPU). In addition, one or more virtual machines may also run on storage device 110. In some embodiments, storage device 110 may be implemented with a data storage system or as a part of a data storage system.

Switching device 120 is, for example, but is not limited to, a programmable switch, which can be reprogrammed with new features and functions that are not limited to network-related functions. A program for the programmable switch may be, for example, written in the P4 language and can be online updated to the programmable switch.

Terminal device 130 is, for example, but is not limited to, an Internet of Things device such as an air-conditioning controller, an intelligent lock, a traffic light, and a network camera. In some embodiments, terminal device 130 may include at least a communication module, a memory, and a processor. The communication module is configured to communicate with storage device 110 through switching device 120, for example, sending a data block to storage device 110 through switching device 120. The memory is configured to store one or more computer programs. The processor is coupled to the memory and executes one or more programs to enable terminal device 130 to perform one or more functions.

Storage device 110 is configured to receive a data block and fingerprint information correlated with the data block from switching device 120, the fingerprint information being configured to identify the data block, and determine a storage position of the received data block based on predetermined correlations between fingerprint information and storage positions as well as the received fingerprint information, the predetermined correlations including at least correlations between historical fingerprint information correlated with stored data blocks and historical storage positions.

Switching device 120 is configured to receive a data block from terminal device 130, generate, based on the data block, fingerprint information correlated with the data block, the fingerprint information being configured to identify the data block, and forward the data block and the fingerprint information to storage device 110.

Actions performed by storage device 110 are described below in detail with reference to FIG. 2.

Figure 2:
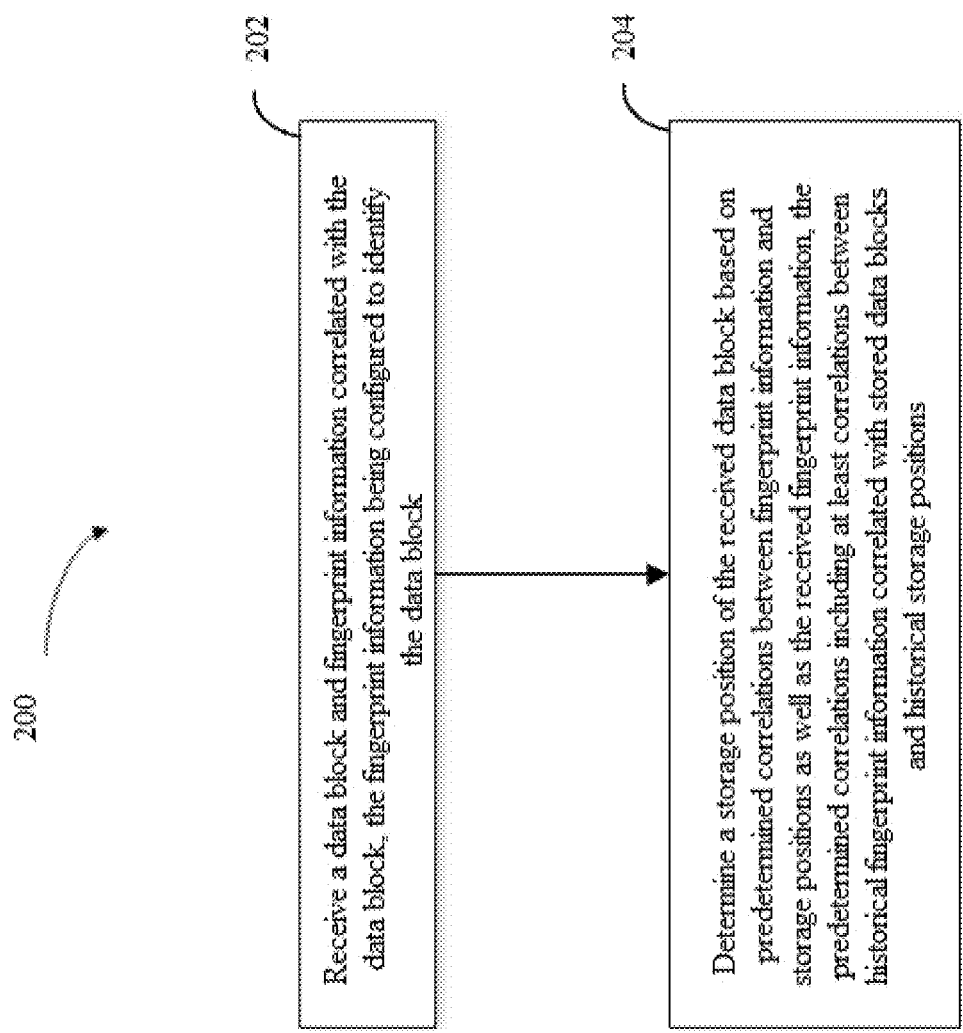
FIG. 2 is a schematic flowchart of method 200 for information processing according to an embodiment of the present disclosure.

FIG. 2 is a flowchart of method 200 for information processing according to an embodiment of the present disclosure. For example, method 200 may be performed by storage device 110 as shown in FIG. 1. It should be understood that method 200 may also include additional blocks that are not shown and/or may omit blocks that are shown, and the scope of the present disclosure is not limited in this regard.

In block 202, storage device 110 receives a data block and fingerprint information correlated with the data block, the fingerprint information being configured to identify the data block. The data block may be, for example, received by storage device 110 from terminal device 130 via switching device 120, e.g., through a packet. The fingerprint information correlated with the data block may be, for example, generated by switching device 120 based on the data block and received by storage device 110 from switching device 120. The data block may be, for example, one of several data blocks that form a file.

In some embodiments, the fingerprint information may include hash information correlated with the data block, for example, hash results of hash operations such as SHA256 and SHA512 performed on the data block. Alternatively or additionally, in some embodiments, the fingerprint information may include checksum information correlated with the data block, for example, a 32-bit XOR checksum.

In block 204, storage device 110 determines a storage position of the received data block based on predetermined correlations between fingerprint information and storage positions as well as the received fingerprint information, the predetermined correlations including at least correlations between historical fingerprint information correlated with stored data blocks and historical storage positions.

The predetermined correlations may include, for example, a table of correlations between historical fingerprint information correlated with stored data blocks and historical storage positions. For example, as shown in Table 1 below, the table of correlations may include two columns, one column is fingerprint information, and the other column is storage positions.

TABLE 1

| Fingerprint Information | Storage Position |
|---|---|
| F0 | S0 |
| F1 | S1 |
| F2 | S2 |

For example, as shown in Table 1 above, the table of correlations includes fingerprint information F0 correlated with data block D0 and storage position S0, fingerprint information F1 correlated with data block D1 and storage position S1, and fingerprint information F2 correlated with data block D2 and storage position S2. If received fingerprint information F3 correlated with data block D3, for example, F1, is found in the table of correlations, it indicates that data block D1 is the same as data block D3. That is, data block D3 is redundant. If fingerprint information F3 is not found in the table of correlations, it indicates that data block D3 is a new data block and is not redundant.

Thus, a storage position of a data block is determined based on received fingerprint information correlated with the data block and predetermined correlations between fingerprint information and storage positions, which avoids consuming local resources of a storage device for calculating the fingerprint information, thereby improving the efficiency of redundant data deletion.

Figure 3:
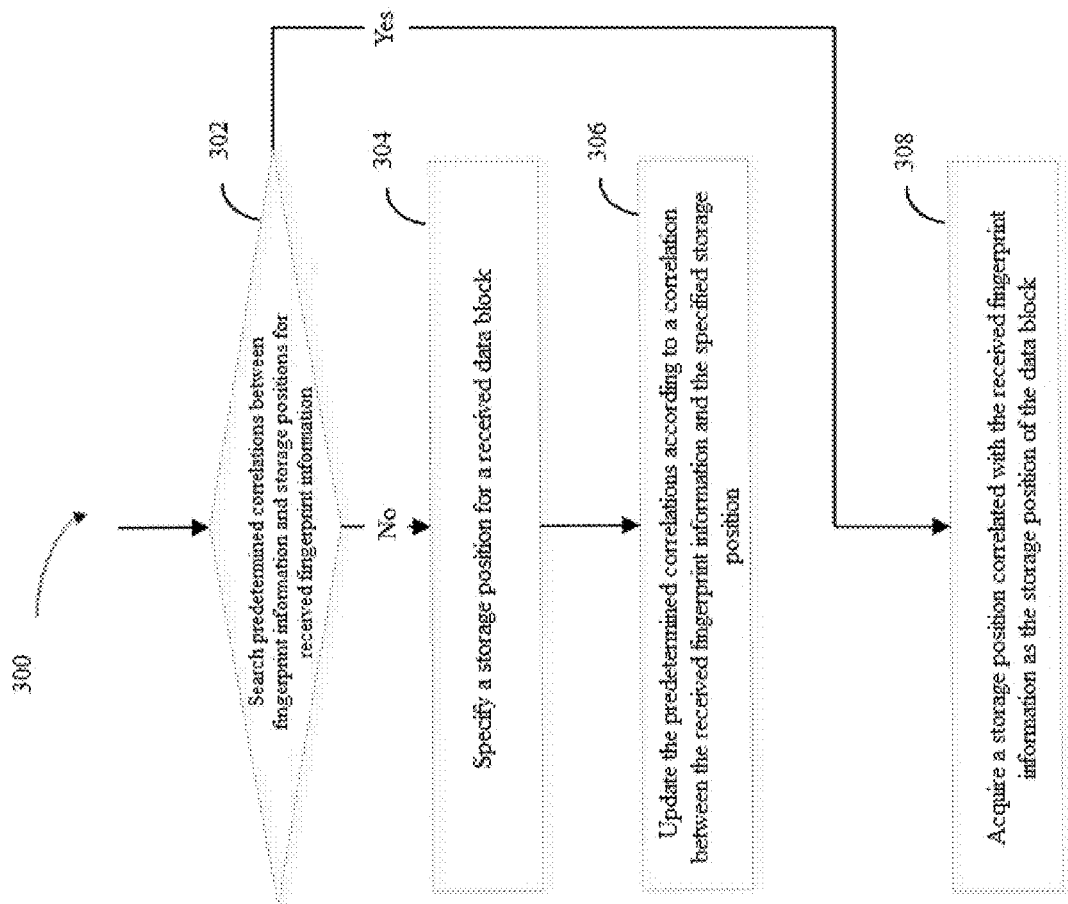
FIG. 3 is a schematic flowchart of method 300 for determining a storage position of a received data block according to an embodiment of the present disclosure.

FIG. 3 is a flowchart of method 300 for determining a storage position of a received data block according to an embodiment of the present disclosure. For example, method 300 may be performed by storage device 110 as shown in FIG. 1. It should be understood that method 300 may also include additional blocks that are not shown and/or may omit blocks that are shown, and the scope of the present disclosure is not limited in this regard.

In block 302, storage device 110 searches predetermined correlations between fingerprint information and storage positions for received fingerprint information. In some embodiments, the fingerprint information includes hash information, and storage device 110 searches predetermined correlations between hash information and storage positions for the received hash information. Alternatively or additionally, in some embodiments, the fingerprint information includes checksum information, and storage device 110 searches predetermined correlations between checksum information and storage positions for the received checksum information. The predetermined correlations may include, for example, the above-mentioned table of correlations, which will not be repeated here.

If storage device 110 determines that the received fingerprint information is not found in the predetermined correlations in block 302, a storage position is specified for the received data block in block 304. The storage position may be specified using any appropriate method. The storage position may include a storage position in storage device 110, or a storage position in a storage system correlated with storage device 110, for example, a storage position in a storage pool correlated with storage device 110.

In block 306, storage device 110 updates the predetermined correlations according to a correlation between the received fingerprint information and the specified storage position.

By taking data block D3 and fingerprint information F3 described above as an example, if fingerprint information F3 is not found in the table of correlations, it indicates that data block D3 is not redundant, then a storage position (e.g., storage position S3) is specified for data block D3, and a correlation between fingerprint information F3 and storage position S3 of data block D3 is added to the table of correlations. The updated table of correlations may be as shown in Table 2 below:

TABLE 2

| Fingerprint Information | Storage Position |
|---|---|
| F0 | S0 |
| F1 | S1 |
| F2 | S2 |
| F3 | S3 |

In some embodiments, method 300 may further include storing the received data block in the specified storage position.

If storage device 110 determines that the received fingerprint information is found in the predetermined correlations in block 302, a storage position correlated with the received fingerprint information is acquired as the storage position of the data block in block 308.

For example, by taking data block D3 and fingerprint information F3 described above as an example, if fingerprint information F3 is found in the table of correlations, for example, F1 being the same as F3, it indicates that data block D3 is redundant, and data block D3 is not stored. Instead, storage position S1 correlated with fingerprint information F1 is acquired as the storage position of data block D3.

Thus, in the case where the received fingerprint information is not found in the predetermined correlations, a storage position is specified for the received data block, and the predetermined correlations are updated using the correlation between the fingerprint information and the storage position, which can ensure correct storage of non-redundant data blocks and avoid subsequent repeated storage of redundant data blocks. In the case where the received fingerprint information is found in the predetermined correlations, a storage position correlated with the received fingerprint information is directly acquired as the storage position of the data block, instead of storing the data block, which avoids storage of redundant data blocks and improves data storage efficiency.

Figure 4:
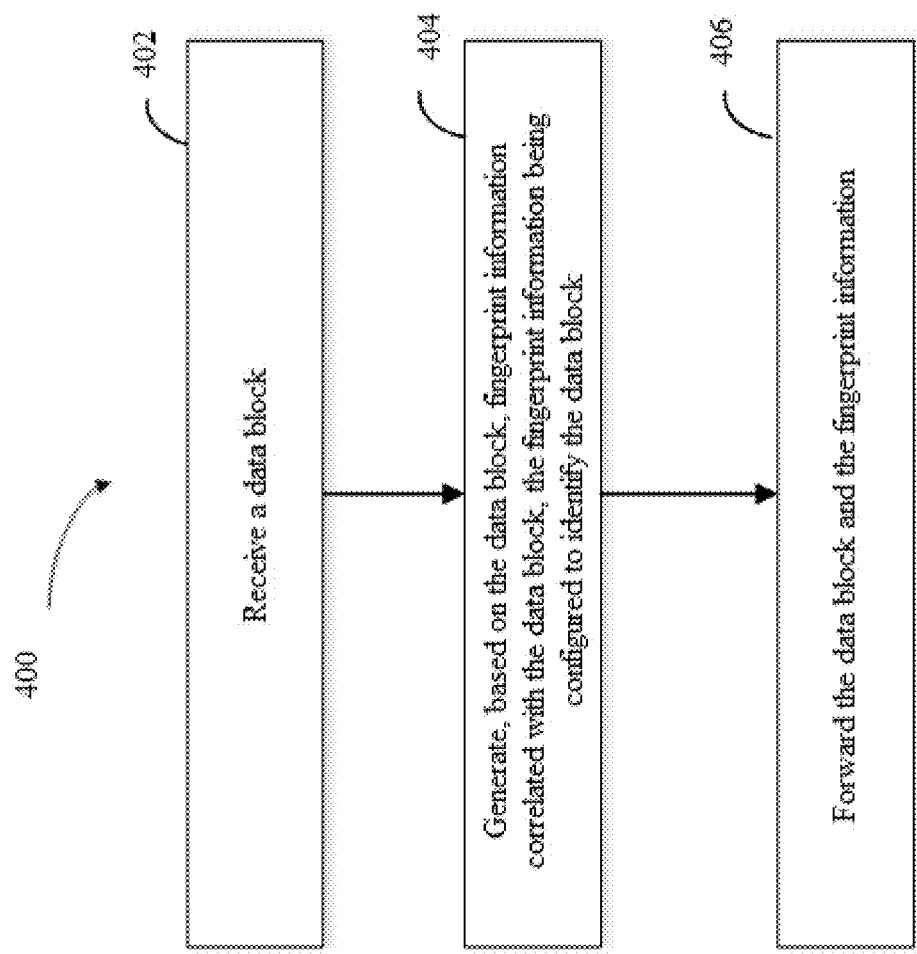
FIG. 4 is a schematic flowchart of method 400 for information processing according to an embodiment of the present disclosure.

FIG. 4 is a flowchart of method 400 for information processing according to an embodiment of the present disclosure. For example, method 400 may be performed by switching device 120 as shown in FIG. 1. It should be understood that method 400 may also include additional blocks that are not shown and/or may omit blocks that are shown, and the scope of the present disclosure is not limited in this regard.

In block 402, switching device 120 receives a data block. The data block is, for example, received by switching device 120 from terminal device 130, for example, via a packet from terminal device 130 to storage device 110. Switching device 120 may be, for example, an edge switch connected to terminal device 130.

In some embodiments, switching device 120 may include a programmable switch.

In block 404, switching device 120 generates, based on a data block, fingerprint information correlated with the data block, the fingerprint information being configured to identify the data block.

In some embodiments, generating the fingerprint information correlated with the data block may include generating, by switching device 120, hash information correlated with the data block. For example, switching device 120 may perform hash operations such as SHA256 and SHA512 on the data block to obtain hash results. Alternatively or additionally, in some embodiments, generating the fingerprint information correlated with the data block may also include generating, by switching device 120, checksum information correlated with the data block, for example, a 32-bit XOR checksum.

For example, hash operations and/or checksums can be implemented using the P4 language. A recycling mechanism provided by P4 makes it possible to calculate all data blocks one by one. For an XOR checksum, only 9 operations are needed to calculate a checksum of 8192 bits, which is very efficient.

In block 406, the data block and the fingerprint information are forwarded. Forwarding the data block and the fingerprint information may include, for example, appending the fingerprint information correlated with the data block to a packet that holds the data block, and forwarding the packet to a destination to which it is going, for example, storage device 110.

Thus, local calculation of fingerprint information by a storage device is avoided by transferring, through a switching device, fingerprint information to be locally calculated by the storage device to a network for calculation, thereby improving the efficiency of deletion of redundant data from the storage device.

Figure 5:
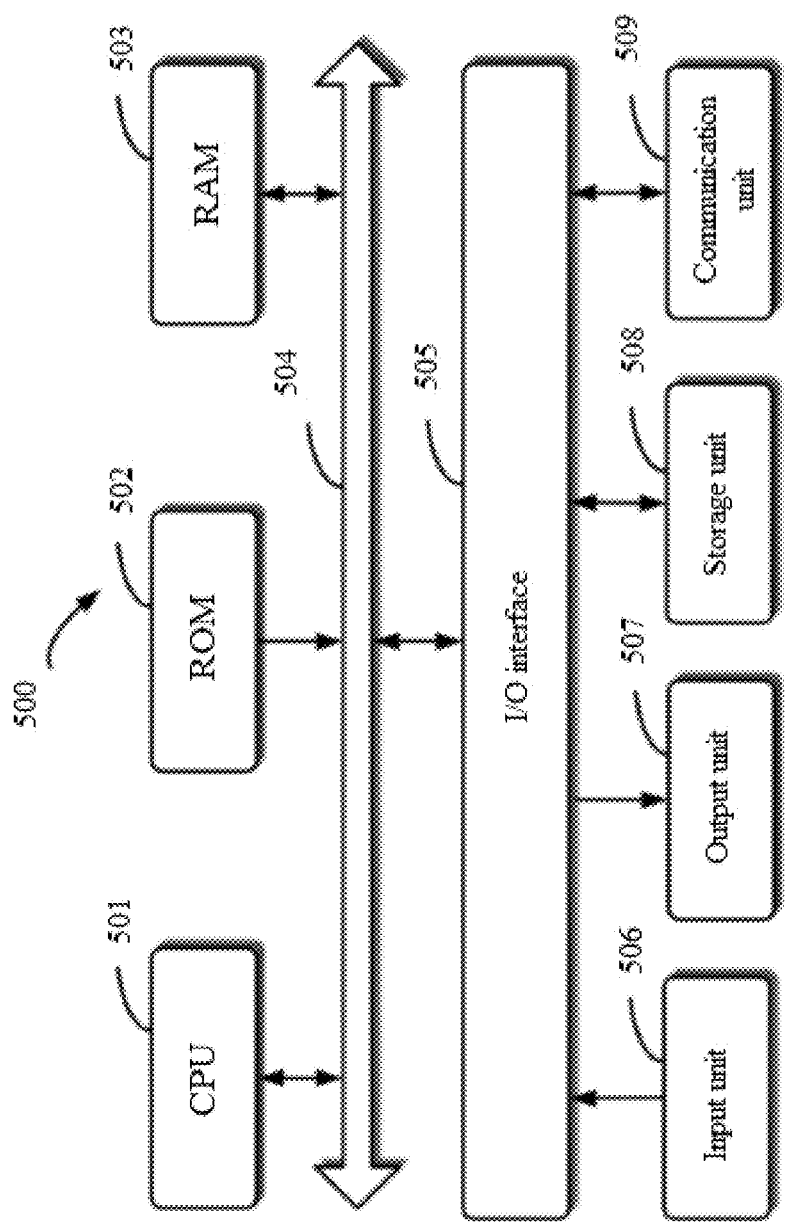
FIG. 5 is a schematic block diagram of example device 500 that can be configured to implement an embodiment of the present disclosure.

FIG. 5 is a schematic block diagram of example device 500 that can be configured to implement an embodiment of the present disclosure. For example, storage device 110 and switching device 120 as shown in FIG. 1 can be implemented by device 500. As shown in the figure, device 500 includes central processing unit (CPU) 501 that may perform various appropriate actions and processing according to computer program instructions stored in read-only memory (ROM) 502 or computer program instructions loaded from storage unit 508 to random access memory (RAM) 503. In RAM 503, various programs and data required for the operation of device 500 may also be stored. CPU 501, ROM 502, and RAM 503 are connected to each other through bus 504. Input/output (I/O) interface 505 is also connected to bus 504.

A plurality of components in device 500 are coupled to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices over a computer network such as the Internet and/or various telecommunication networks.

Various processes and processing described above, for example, methods 200-400, may be performed by CPU 501. For example, in some embodiments, methods 200-400 may be implemented as a computer software program that is tangibly included in a machine-readable medium such as storage unit 508. In some embodiments, some or all of the computer program may be loaded and/or installed onto device 500 through ROM 502 and/or communication unit 509. When the computer program is loaded into RAM 503 and executed by CPU 501, one or more actions of methods 200-400 described above may be performed.

Embodiments of the present disclosure include a method, an apparatus, a system, and/or a computer program product. The computer program product may include a computer-readable storage medium with computer-readable program instructions for performing various aspects of the present disclosure loaded thereon.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protruding structure in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk and C++, as well as conventional procedural programming languages such as the "C" language or similar programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer may be connected to a user's computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of computer-readable program instructions. The electronic circuit can execute the computer-readable program instructions to implement various aspects of the present disclosure.

Various aspects of the present disclosure are described here with reference to flowcharts and/or block diagrams of the method, the apparatus (system), and the computer program product according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general-purpose computer, a special-purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, a programmable data processing apparatus, and/or other devices to work in a specific manner, such that the computer-readable medium storing the instructions includes an article of manufacture that includes instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate architectures, functions, and operations of possible implementations of systems, methods, and computer program products according to multiple embodiments of the present disclosure. In this regard, each block in the flowcharts or block diagrams may represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above. The foregoing description is illustrative rather than exhaustive, and is not limited to the disclosed various embodiments. Numerous modifications and changes are apparent to those of ordinary skill in the art without departing from the scope and spirit of the illustrated various embodiments. The selection of terms as used herein is intended to best explain the principles and practical applications of the various embodiments or the technical improvements to technologies on the market, and to otherwise enable other persons of ordinary skill in the art to understand the embodiments disclosed herein.

What is claimed is:

1. A method for information processing, comprising:
   receiving, at a storage device, a data block and fingerprint information correlated with the data block, the fingerprint information being configured to identify the data block; and
   determining a storage position of the received data block based on predetermined correlations between fingerprint information and storage positions as well as the received fingerprint information, the predetermined correlations comprising at least correlations between historical fingerprint information correlated with stored data blocks and historical storage positions;
   wherein receiving the data block and the fingerprint information correlated with the data block comprises:
   receiving, at a network switching device from a terminal device, the data block; and
   receiving, at the storage device from the network switching device, the data block and the fingerprint information correlated with the data block, wherein the received fingerprint information is generated by the network switching device based on the data block;
   wherein the network switching device comprises a programmable switch and is implemented in an edge device of a network separate from a storage system that includes the storage device;
   wherein the programmable switch of the network switching device is programmed to (i) perform hash operations and/or checksum operations on the data block to generate the fingerprint information, (ii) combine the fingerprint information with a packet that holds the data block, and (iii) forward the packet combined with the fingerprint information to the storage device; and
   wherein the terminal device comprises an Internet of Things device that is configured for communication with the edge device of the network.

2. The method of claim 1, wherein determining the storage position of the received data block comprises:
   searching the predetermined correlations for the received fingerprint information; and
   in response to a determination that the received fingerprint information is not found in the predetermined correlations,
   specifying a storage position for the received data block, and
   updating the predetermined correlations according to a correlation between the received fingerprint information and the specified storage position.

3. The method of claim 2, further comprising:
   storing the received data block in the specified storage position.

4. The method of claim 1, wherein determining the storage position of the received data block comprises:
   searching the predetermined correlations for the received fingerprint information; and
   in response to a determination that the received fingerprint information is found in the predetermined correlations, acquiring a storage position correlated with the received fingerprint information as the storage position of the data block.

5. The method of claim 1, wherein receiving the fingerprint information comprises:
receiving at least one of hash information and checksum information that are correlated with the data block.

6. The method of claim 1, wherein the predetermined correlations comprise a table of correlations between historical fingerprint information correlated with stored data blocks and historical storage positions.

7. An electronic device, comprising:
at least one processing unit; and
at least one memory coupled to the at least one processing unit and storing instructions for execution by the at least one processing unit, wherein when executed by the at least one processing unit, the instructions cause the device to perform steps of:
receiving a data block and fingerprint information correlated with the data block, the fingerprint information being configured to identify the data block; and
determining a storage position of the received data block based on predetermined correlations between fingerprint information and storage positions as well as the received fingerprint information, the predetermined correlations comprising at least correlations between historical fingerprint information correlated with stored data blocks and historical storage positions;
wherein receiving the data block and the fingerprint information correlated with the data block comprises:
receiving, at a network switching device from a terminal device, the data block; and
receiving, at the storage device from the network switching device, the data block and the fingerprint information correlated with the data block, wherein the received fingerprint information is generated by the network switching device based on the data block;
wherein the network switching device comprises a programmable switch and is implemented in an edge device of a network separate from a storage system that includes the storage device;
wherein the programmable switch of the network switching device is programmed to (i) perform hash operations and/or checksum operations on the data block to generate the fingerprint information, (ii) combine the fingerprint information with a packet that holds the data block, and (iii) forward the packet combined with the fingerprint information to the storage device; and
wherein the terminal device comprises an Internet of Things device that is configured for communication with the edge device of the network.

8. The device of claim 7, wherein determining the storage position of the received data block comprises:
searching the predetermined correlations for the received fingerprint information; and
in response to a determination that the received fingerprint information is not found in the predetermined correlations,
specifying a storage position for the received data block, and
updating the predetermined correlations according to a correlation between the received fingerprint information and the specified storage position.

9. The device of claim 8, wherein when executed by the at least one processing unit, the instructions further cause the device to perform a step of:
storing the received data block in the specified storage position.

10. The device of claim 7, wherein determining the storage position of the received data block comprises:

searching the predetermined correlations for the received fingerprint information; and
in response to a determination that the received fingerprint information is found in the predetermined correlations, acquiring a storage position correlated with the received fingerprint information as the storage position of the data block.

11. The device of claim 7, wherein receiving the fingerprint information comprises:
receiving at least one of hash information and checksum information that are correlated with the data block.

12. The device of claim 7, wherein receiving the fingerprint information comprises receiving checksum information that is correlated with the data block, the checksum information comprising an XOR checksum.

13. The device of claim 7, wherein the predetermined correlations comprise a table of correlations between historical fingerprint information correlated with stored data blocks and historical storage positions.

14. A non-transitory computer-readable storage medium with computer programs stored thereon, wherein when executed by a machine, the computer programs implement a method for information processing, the method comprising:
receiving, at a storage device, a data block and fingerprint information correlated with the data block, the fingerprint information being configured to identify the data block; and
determining a storage position of the received data block based on predetermined correlations between fingerprint information and storage positions as well as the received fingerprint information, the predetermined correlations comprising at least correlations between historical fingerprint information correlated with stored data blocks and historical storage positions;
wherein receiving the data block and the fingerprint information correlated with the data block comprises:
receiving, at a network switching device from a terminal device, the data block; and
receiving, at the storage device from the network switching device, the data block and the fingerprint information correlated with the data block, wherein the received fingerprint information is generated by the network switching device based on the data block;
wherein the network switching device comprises a programmable switch and is implemented in an edge device of a network separate from a storage system that includes the storage device;
wherein the programmable switch of the network switching device is programmed to (i) perform hash operations and/or checksum operations on the data block to generate the fingerprint information, (ii) combine the fingerprint information with a packet that holds the data block, and (iii) forward the packet combined with the fingerprint information to the storage device; and
wherein the terminal device comprises an Internet of Things device that is configured for communication with the edge device of the network.

15. The non-transitory computer-readable storage medium of claim 14, wherein determining the storage position of the received data block comprises:
searching the predetermined correlations for the received fingerprint information; and
in response to a determination that the received fingerprint information is not found in the predetermined correlations, specifying a storage position for the received data block, and updating the predetermined correlations according to a correlation between the received fingerprint information and the specified storage position.

16. The non-transitory computer-readable storage medium of claim 15, further comprising:

storing the received data block in the specified storage position.

17. The non-transitory computer-readable storage medium of claim 14, wherein determining the storage position of the received data block comprises:

searching the predetermined correlations for the received fingerprint information; and in response to a determination that the received fingerprint information is found in the predetermined correlations, acquiring a storage position correlated with the received fingerprint information as the storage position of the data block.

18. The non-transitory computer-readable storage medium of claim 14, wherein receiving the fingerprint information comprises:

receiving at least one of hash information and checksum information that are correlated with the data block.

19. The non-transitory computer-readable storage medium of claim 14, wherein receiving the fingerprint information comprises receiving checksum information that is correlated with the data block, the checksum information comprising an XOR checksum.

20. The non-transitory computer-readable storage medium of claim 14, wherein the predetermined correlations comprise a table of correlations between historical fingerprint information correlated with stored data blocks and historical storage positions.

* * * * *